United States Patent
Lange

(10) Patent No.: US 9,663,091 B2
(45) Date of Patent: May 30, 2017

(54) COUPLING ARRANGEMENT BETWEEN A LIQUID RESERVOIR AND A MAIN BRAKE CYLINDER OF A MOTOR VEHICLE BRAKING SYSTEM

(71) Applicant: Lucas Automotive GmbH, Koblenz (DE)

(72) Inventor: Hans Christoph Lange, Nörtershausen (DE)

(73) Assignee: LUCAS AUTOMOTIVE GMBH, Koblenz (DE)

(*) Notice: Subject to any disclaimer, the term of this patent is extended or adjusted under 35 U.S.C. 154(b) by 166 days.

(21) Appl. No.: 14/763,669

(22) PCT Filed: Jan. 8, 2014

(86) PCT No.: PCT/EP2014/050180
§ 371 (c)(1),
(2) Date: Jul. 27, 2015

(87) PCT Pub. No.: WO2014/114487
PCT Pub. Date: Jul. 31, 2014

(65) Prior Publication Data
US 2015/0360670 A1    Dec. 17, 2015

(30) Foreign Application Priority Data
Jan. 25, 2013 (DE) .................. 10 2013 001 388

(51) Int. Cl.
*B60T 17/06* (2006.01)
*B60T 11/22* (2006.01)
*B60T 11/26* (2006.01)

(52) U.S. Cl.
CPC .............. *B60T 17/06* (2013.01); *B60T 11/22* (2013.01); *B60T 11/26* (2013.01); *Y10T 403/7075* (2015.01)

(58) Field of Classification Search
CPC .................................. B60T 11/26; B60T 17/06
(Continued)

(56) References Cited

U.S. PATENT DOCUMENTS 5,031,405 A * 7/1991 Takahashi ............... B60T 11/26
                                                                   200/84 C
5,946,914 A * 9/1999 Crumb .................... B60T 11/26
                                                                   60/583

(Continued)

FOREIGN PATENT DOCUMENTS

DE      19921195 A1    12/1999
DE      19847323 A1     4/2000
(Continued)

OTHER PUBLICATIONS

German Search Report, Application No. DE102013001388.7, dated Sep. 24, 2013.
(Continued)

*Primary Examiner* — Thomas E Lazo
(74) *Attorney, Agent, or Firm* — MacMillan, Sobanski & Todd, LLC

(57) ABSTRACT

A coupling arrangement between a fluid reservoir and a main brake cylinder for a motor vehicle brake system includes two coupling arms with one coupling aperture each on one of the fluid reservoir or main brake cylinder. The other of the fluid reservoir or main brake cylinder has a mounting portion with a receiving aperture. The coupling apertures and the receiving aperture are aligned with each other along a common axis and accept a coupling bolt. The coupling bolt is configured with a cylindrical shank portion and at least one radially protruding detent projection. At least one of the coupling arms includes a support portion, which has a support surface that radially supports the cylindrical shank portion. Part of the support portion is configured to be elastically deformable with the detent (Continued)

projection to produce a detent connection. The remaining part of the support portion is configured to be substantially deformation-resistant.

18 Claims, 6 Drawing Sheets

(58) Field of Classification Search
USPC .......................................................... 60/585
See application file for complete search history.

(56) References Cited

U.S. PATENT DOCUMENTS 7,441,408 B2 * 10/2008 Bourlon .................. B60T 11/22
  60/585
9,199,619 B2 * 12/2015 Neumann ............... B60T 11/22

FOREIGN PATENT DOCUMENTS

| DE | 10217682 A1 | 11/2003 |
| DE | 102007041500 A1 | 3/2009 |
| EP | 0994262 A2 | 4/2000 |
| EP | 1190923 A2 | 3/2002 |
| EP | 1870305 A1 | 12/2007 |
| WO | 2011012398 A2 | 2/2011 |

OTHER PUBLICATIONS

PCT International Search Report and Written Opinion, Application No. PCT/EP2014/050180, dated Jul. 14, 2014.

* cited by examiner

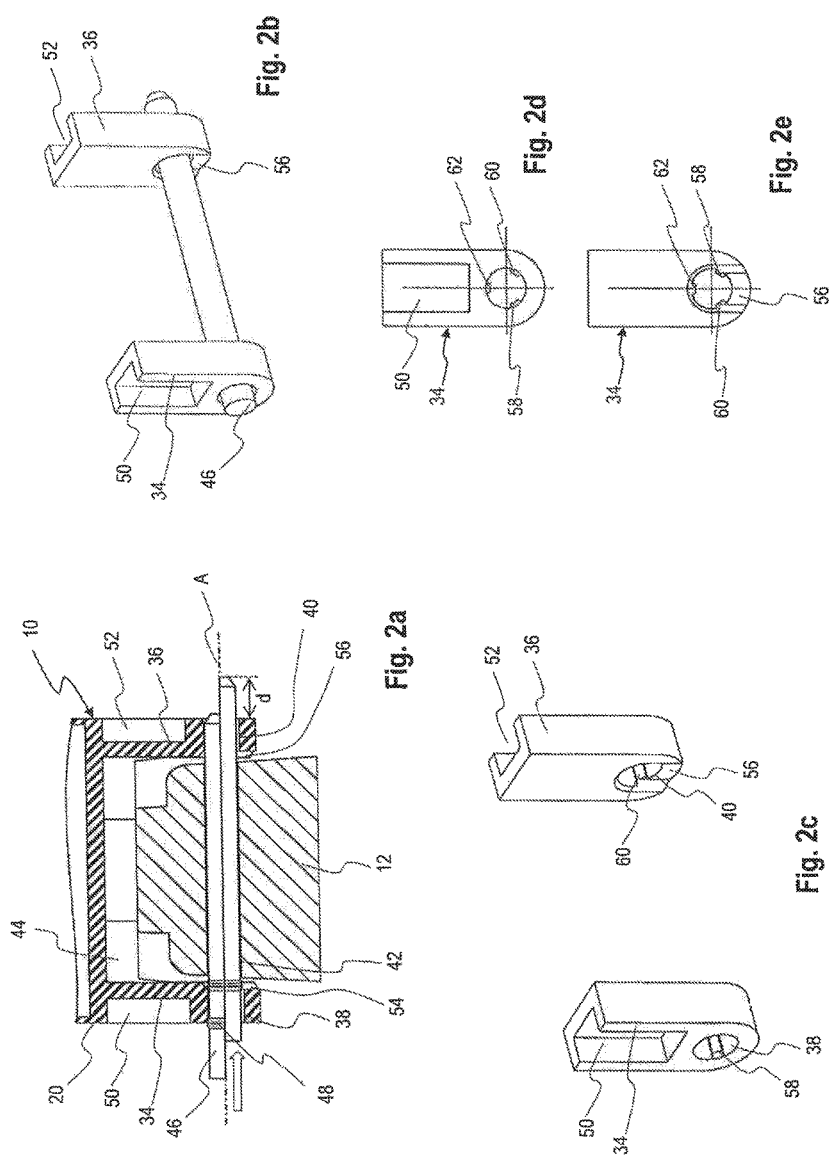

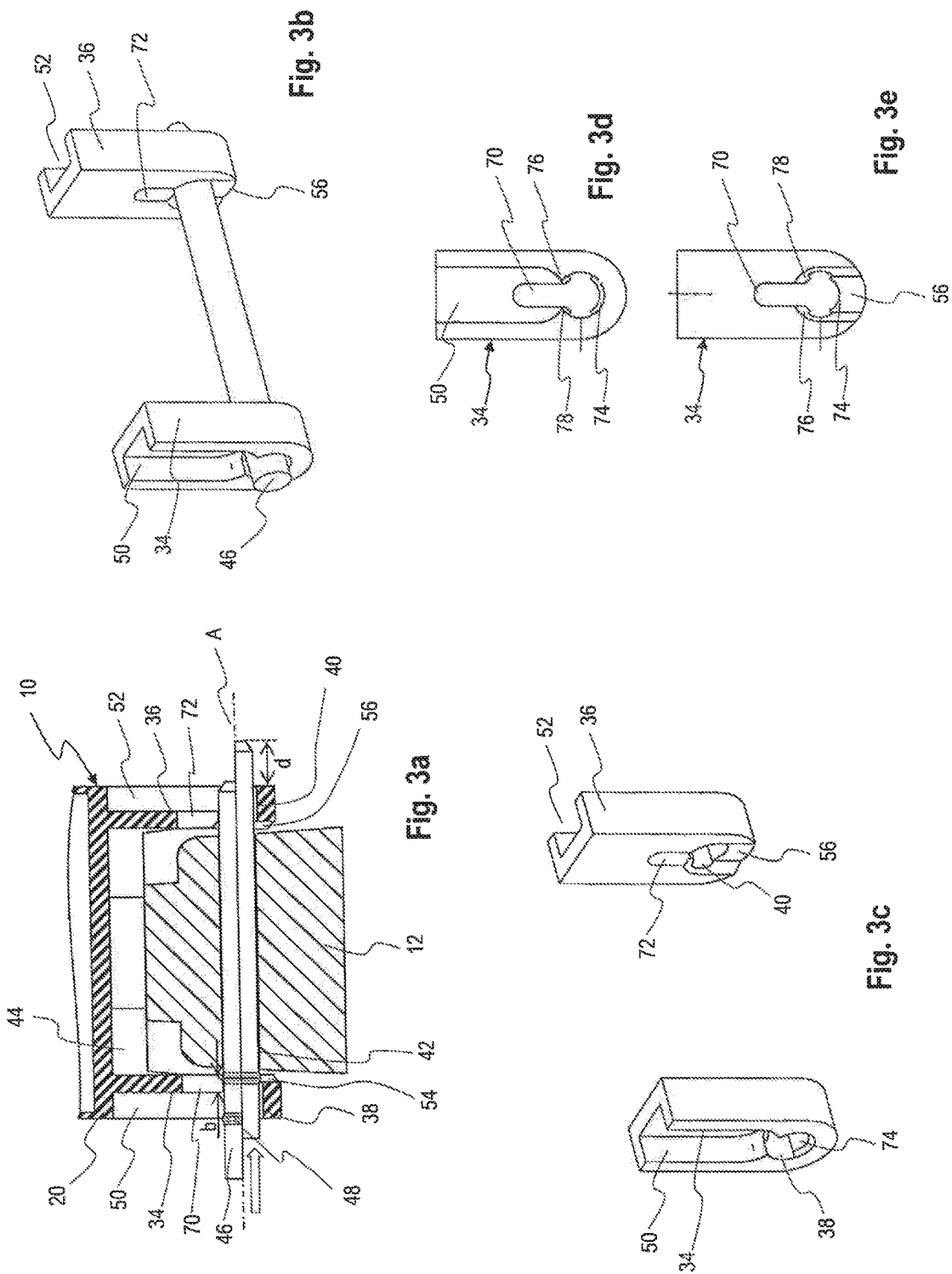

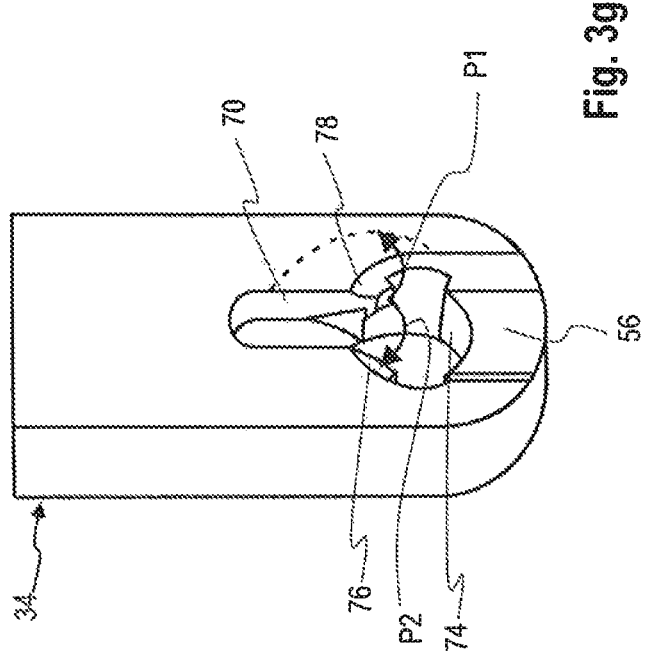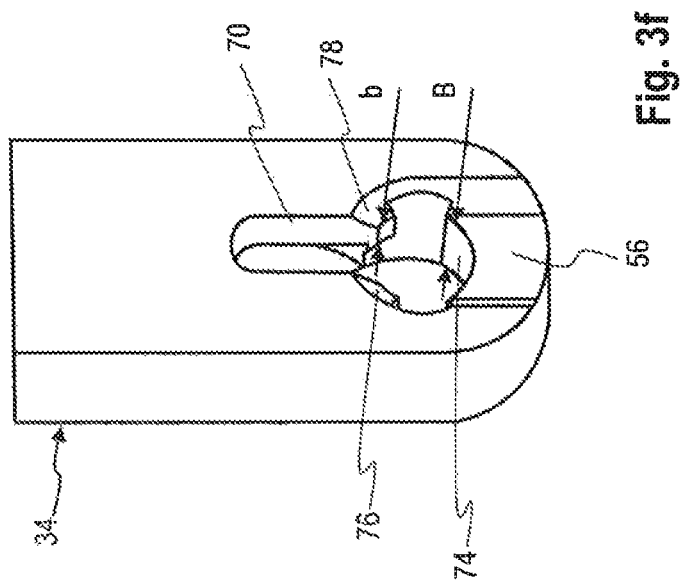

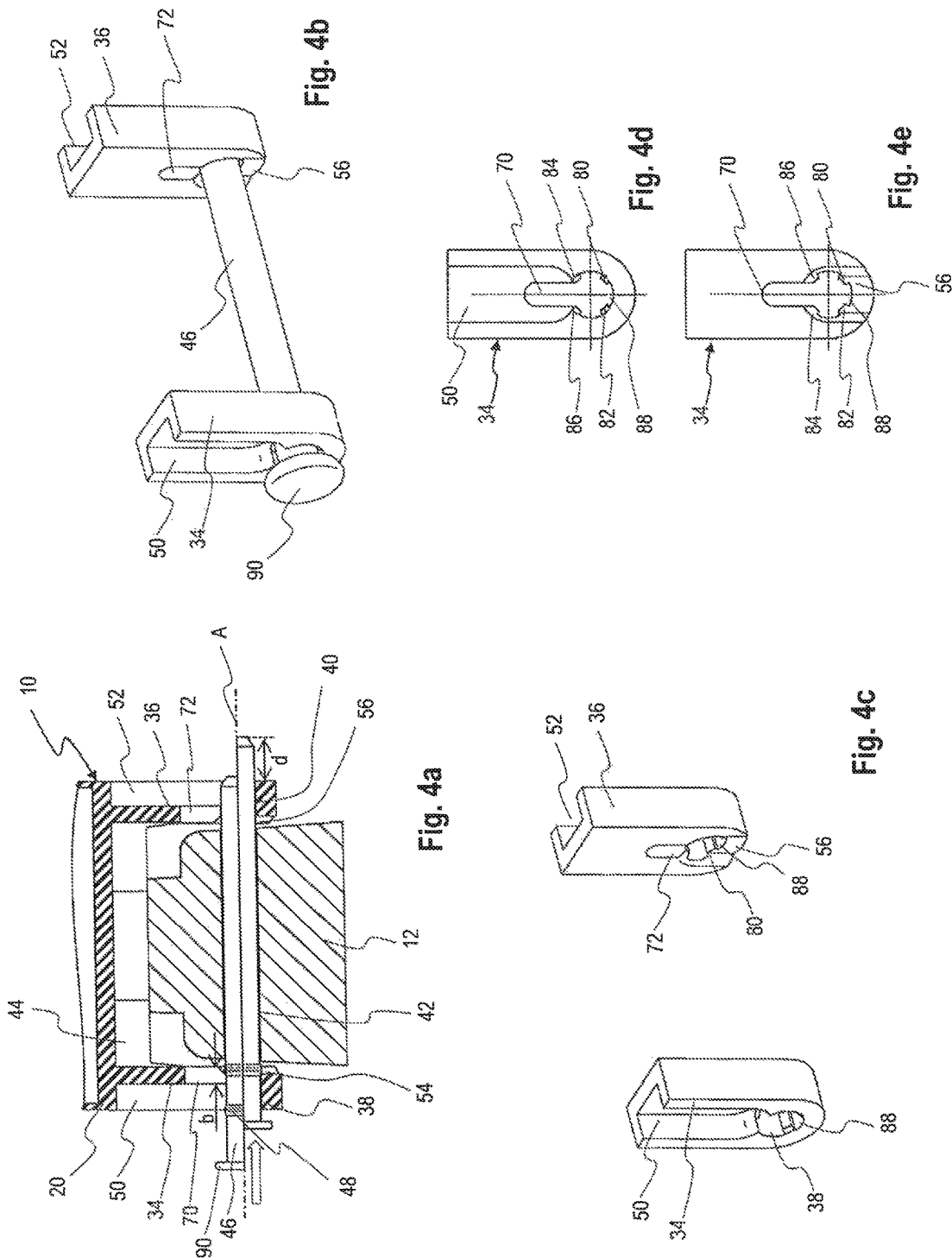

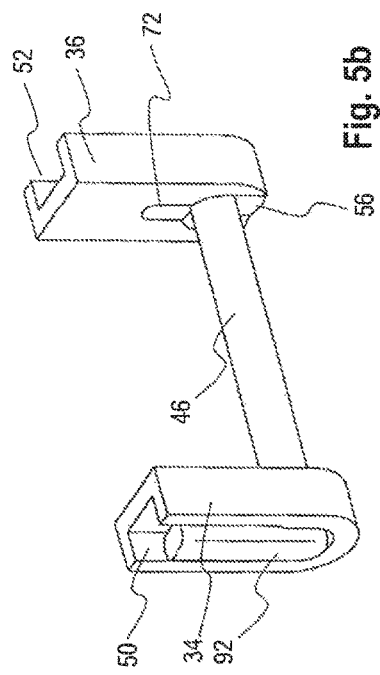
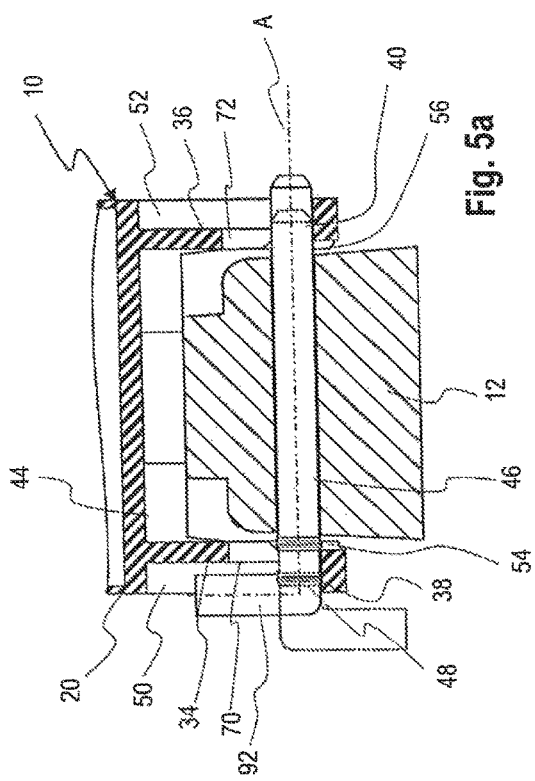
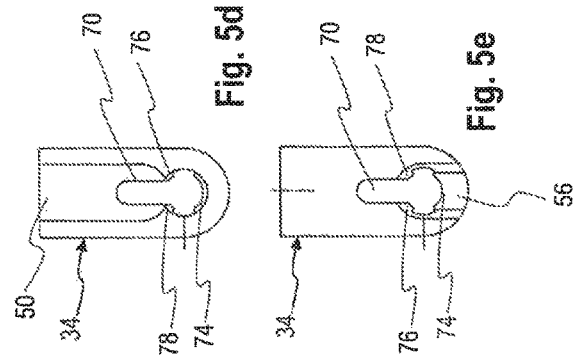
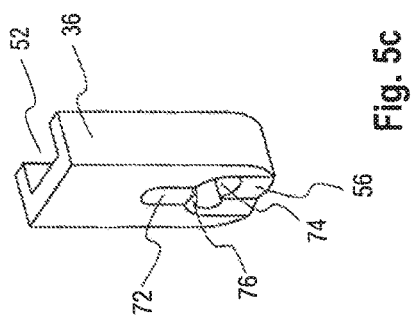
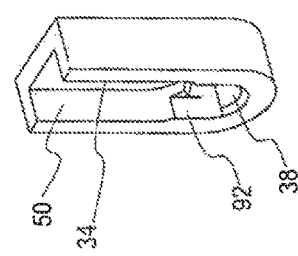

COUPLING ARRANGEMENT BETWEEN A LIQUID RESERVOIR AND A MAIN BRAKE CYLINDER OF A MOTOR VEHICLE BRAKING SYSTEM

CROSS-REFERENCE TO RELATED APPLICATIONS

This application is a national stage of International Application No. PCT/EP2014/050180, filed Jan. 8, 2014, which designated the U.S. and was published on Jul. 31, 2014 as International Publication No. WO 2014/114487 A2. PCT/EP2014/050180 claims priority to German Patent Application No. 10 2013 001 388.7 filed Jan. 25, 2013. The disclosures of both applications are incorporated herein by reference in their entirety.

BACKGROUND OF THE INVENTION

The present invention relates to a coupling arrangement between a fluid reservoir and a main brake cylinder for a motor vehicle brake system, wherein on one of the components of fluid reservoir or main brake cylinder two coupling arms with one coupling aperture each are arranged, wherein on the other component of fluid reservoir or main brake cylinder a mounting portion with a receiving aperture is arranged, wherein the two coupling arms contact the mounting portion in such a way that in a mounted state the coupling apertures and the receiving aperture are aligned with each other along a common axis, wherein for coupling the mounting portion to the two coupling arms a coupling bolt is insertable into the coupling apertures and the receiving aperture and is fixable relative to at least one coupling arm or to the mounting portion, wherein the coupling bolt is configured with a cylindrical shank portion and at least one radially protruding detent projection.

Hydraulic motor vehicle brake systems, of the kind used in large numbers in modern automobile manufacture, are conventionally filled with brake fluid prior to installation. For the first filling the entire hydraulic motor vehicle brake system is initially evacuated and then the brake fluid is "injected" into the fluid reservoir in order to execute the filling rapidly and under considerable pressure into the fluid reservoir. During this process reaction forces arise between the main brake cylinder and the fluid reservoir and lead to a relative movement of these two components relative to one another. During operation vibrations moreover occur over the service life of the vehicle and likewise have an effect upon the connection between main brake cylinder and fluid reservoir. In order to prevent an unintentional detachment of these two components from one another they need to be coupled to one another by a coupling arrangement durably and with sufficient stability to withstand the previously described mechanical influences.

Such coupling arrangements are prior art. For example the genre-defining background art according to the document WO 2011/012398 A2 discloses such a coupling arrangement, in which the fluid reservoir and the main brake cylinder are coupled to one another by a detent bolt. The detent bolt is manufactured from plastics material and has on its outer circumferential surface detent projections, which during the assembly process are elastically deformed in order to produce a detent connection. It has however emerged that this solution calls for very precise manufacture of the detent bolt and that even slight non-conformance or ageing of the detent bolt may result in an unintentional detachment of the connection between fluid reservoir and main brake cylinder. If for example the detent projections are dimensioned too small, they do not fulfill their retaining function. If on the other hand the detent projections are dimensioned too large, this may lead during assembly not only to an elastic deformation but also to a plastic deformation of the detent projections, with the result that the detent bolt is damaged and so its retaining function is no longer guaranteed over the service life. In such cases even the above-mentioned filling process may already lead to an unintentional detachment of these two components from one another if the detent bolt is designed with insufficient precision or is of poor quality or has been damaged during assembly as a result of plastic deformation of the detent projections.

The document U.S. Pat. No. 7,441,408 B2 describes a similar coupling arrangement, in which a fastening bolt is likewise used. This is inserted completely into an undercut arrangement with coupling apertures and receiving aperture. The underlying problem of this solution is that, if the fastening bolt is not completely inserted, an incorrect assembly that is not immediately apparent may occur. As a result of the incorrect assembly the fluid reservoir may detach from the main brake cylinder. Disassembly is also relatively complex because the fastening bolt is disposed in a relatively hidden location.

Finally the document EP 1 190 923 B1 describes a coupling arrangement, in which a connection bolt with an angled end is used, which is then fixed by means of a detent receiver during assembly. This solution is unreliable because the connection bolt works loose relatively easily and may then become lost.

BRIEF SUMMARY OF THE INVENTION

The underlying feature of the invention is, with a low manufacturing outlay, to provide a coupling arrangement that is cost-effective and at the same time rugged and easy to assemble and disassemble.

This feature is achieved with a coupling arrangement of the type described in the introduction, in which it is provided that at least one coupling arm in the region of its coupling aperture is configured with a support portion, which has a support surface that radially supports the cylindrical shank portion, wherein a sub-portion of the support portion is configured to be elastically deformable, so that the latter during assembly of the coupling bolt is elastically deflectable in interaction with the detent projection to produce a detent connection, and wherein the remaining part of the support portion is configured to be substantially deformation-resistant.

Unlike in the genre-defining background art described in the introduction, the invention provides that the coupling bolt is configured to be rigid and non-deformable, wherein the elastic deformation is associated with the at least one coupling arm. When designing the coupling arm greater degrees of freedom exist, so that the elastically to deformable regions responsible for the latching may be optimized in terms of the ease of assembly and the quality of the detent connection. The coupling bolt is geometrically relatively easy to design and is therefore cost-effective to manufacture. As will be explained in detail below, it may be manufactured from a sufficiently rigid and/or hard material to prolong the service life, and reduce the susceptibility, of the detent connection.

According to the invention it may be provided that the elastically deformable sub-portion of the support portion is configured with a reduced wall thickness, viewed in axial direction, compared to the wall thickness of the remaining substantially deformation-resistant part of the support portion. The effect achievable thereby is that, in order to produce the detent connection, only the regions that are provided for said purpose are elastically deformed. It is therefore possible to achieve a desired elastic deformation for producing the detent connection. This also prevents the occurrence, during production of the detent connection, of a non-controllable plastic deformation that then adversely affects the connection between the fluid reservoir and the main brake cylinder.

A development of the invention provides that the support portion (also referred to below as support segment(s)) comprises a plurality of elastically deformable sub-portions. In order to predetermine the elastic deformation behavior of the elastically deformable sub-portions provided for said purpose, a development of the invention provides that the coupling aperture close to the elastically deformable sub-portion is provided with a deformation cutout that opens out into the coupling aperture. By virtue of this measure the relevant coupling arm may be deliberately weakened by the deformation cutout in specific regions in order to assist the elastic deformation. This moreover makes it possible to cut down on material and weight. Other regions of the coupling arm, on the other hand, are of a suitably solid construction in order to be able to take up the forces that arise during operation and assembly.

In this connection, according to the invention it may further be provided that the deformation cutout is configured so as to be slot-shaped preferably with rounded transitions. As a result no predetermined breaking points are formed. Furthermore, in this connection according to the invention it may be provided that the at least one deformable sub-portion of the support portion is provided in the region of opening of the deformation cutout into the coupling aperture. According to the invention it is moreover possible that on either side of the opening of the deformation recess into the coupling aperture a deformable sub-portion of the support portion is provided. By virtue of providing a plurality of deformable sub-portions the quality and retaining qualities of the detent connection may be improved. The arrangement of deformable sub-portions, so-called support segments, on either side of the opening ensures that their elastic deformation occurs in a desired manner during assembly and so an undesired plastic deformation may be prevented.

The above discussion related in particular to the elastically deformable sub-portions (support segments) of the support portion. With regard to the remaining, elastically non-deformable sub-portion it may be provided that the substantially deformation-resistant sub-portion of the support portion is divided into at least two support segments. This is achieved in particular in that the sub-portions of the support portion are separated from one another by interruptions. The deformation-resistant sub-portion is configured so as reliably to take up the forces that arise during operation and assembly, but in particular during the pressurized filling of the vehicle brake system, and prevent undesirable relative movements of the two components, fluid reservoir and main brake cylinder, relative to one another.

With regard to all of the sub-portions (support segments) of the support portion, according to a development of the invention it may be provided that these are disposed at regular angular intervals about the longitudinal axis of the coupling aperture. In this way a uniform distribution of force is achieved in the connection region of the two components.

A preferred embodiment of the invention provides that the coupling arms are formed, preferably integrally moulded, on the fluid reservoir and the mounting portion is formed, preferably integrally moulded, on the main brake cylinder. As an alternative to this it is also possible to dispose the coupling arms on the main brake cylinder and the mounting portion on the fluid reservoir. Independently of the selection of one of these two alternatives, the two coupling arms embrace the mounting portion in each case in a fork-shaped manner In principle it is sufficient if only one of the coupling arms is designed with a corresponding support portion structure that is intended to produce a detent connection. However, a development of the invention provides that both coupling arms in the region of the coupling aperture are designed with the previously claimed support portion structure, wherein the latter are provided in a mirror-inverted manner to one another on the coupling arms. This allows an improvement of the ease of assembly of the coupling arrangement in that assembly errors may be ruled out because the coupling bolt may be inserted from both sides and correspondingly latched.

As already provided above, the present invention has the advantage that the detent connection may be produced and maintained in particular by elastic deformation in the region of the coupling arms. As a result of this, in a development of the invention the coupling bolt is manufactured from a harder material, preferably metal, than the coupling arms. This allows the element that is to be manipulated during assembly and disassembly, i.e. the coupling bolt, to be of a design that is more stable and less susceptible to failure than in the prior art.

In this connection it may be provided that the radially protruding projection of the to coupling bolt is configured in the form of a circumferential, preferably rounded, bead. In this case, according to the invention it is possible that the projection protrudes from the outer circumferential surface of the coupling bolt in such a way that during assembly it exceeds the elastic deformation limit of the at least one deformable sub-portion of the support portion. With such a design it is possible to achieve a reliable detent connection that is easy to produce in the course of assembly.

In order to fix a defined assembly position of the coupling bolt, a development of the invention provides that the coupling bolt at one axial end has a cylindrical top extension, the outside diameter of which is greater than the outside diameter of the shank portion and of the maximum outside diameter of the radially protruding projection. Consequently, the coupling bolt may easily be inserted into the coupling apertures until its top extension acts as a stop, wherein the defined assembly position of the coupling bolt is achieved.

In addition or as an alternative thereto it may be provided that the coupling bolt at one axial end has an end portion that is bent at an angle, preferably of 90°.

A development of the invention provides that the coupling bolt in the assembled state at at least one side protrudes from the associated coupling arm. This allows a tool that is specially provided for example for disassembly purposes to be applied to the coupling bolt. Furthermore, the coupling bolt in this region may additionally be provided with a mark, which indicates for example whether the predetermined assembly position has been reached.

Other advantages of this invention will become apparent to those skilled in the art from the following detailed description of the preferred embodiment, when read in light of the accompanying drawings.

BRIEF DESCRIPTION OF THE DRAWINGS

FIG. 2a-2e are various views of the overall arrangement and of details of a first embodiment of the invention;

FIG. 3a-3g are various views of the overall arrangement and of details of a second embodiment of the invention;

FIG. 4a-4e are various views of the overall arrangement and of details of a third embodiment of the invention; and FIG. 5a-5e are various views of the overall arrangement and of details of a fourth embodiment of the invention.

DETAILED DESCRIPTION OF THE PREFERRED EMBODIMENT

Figure 1:
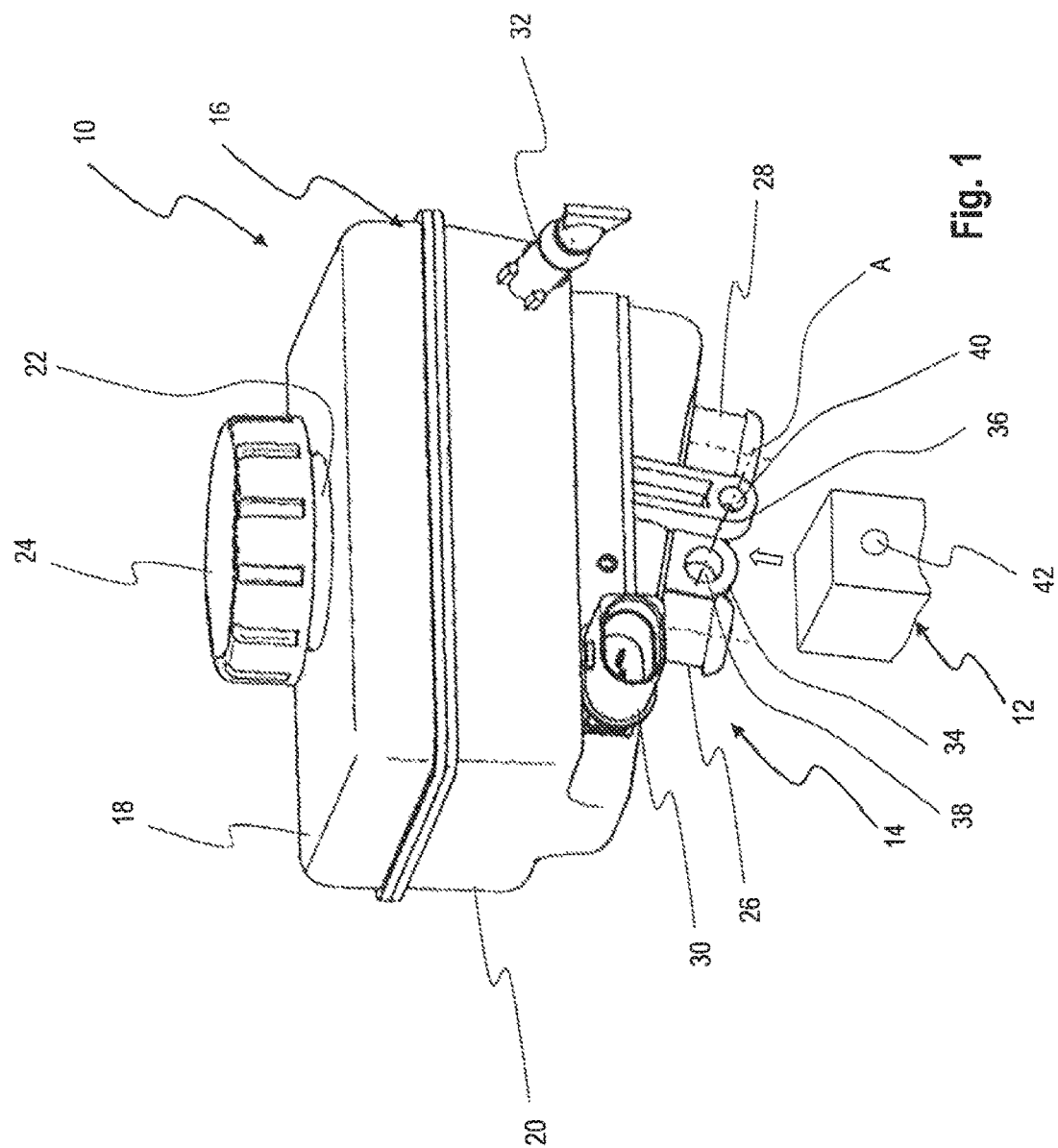
FIG. 1 is a three-dimensional view of a fluid reservoir for mounting on a main brake cylinder.

FIG. 1 shows a three-dimensional view of a fluid reservoir 10 for arranging on a main brake cylinder, which is not shown in detail. Integrally moulded on the main brake cylinder is a mounting portion 12, which is connected to the fluid reservoir 10 by a coupling arrangement 14, as will be described in detail below.

The fluid reservoir 10 is provided with a fluid container 16, which is composed of two hollow bodies 18, 20 that are welded to one another. The top hollow body 18 has a filler neck 22, which provides access for the purpose of replenishment and is closable by means of a lid 24. The bottom hollow body 20 on its underside has two connectors 26, 28, by which it may in a known manner be fluidically coupled in a sealed manner to the main brake cylinder. No further details of this are to be provided. Also evident on the bottom hollow body 20 is an electric connection socket 30 of a filling-level measuring device for connecting a connection cable for the onboard electronics, as well as a further filling neck 32 for the initial filling of the vehicle brake system.

Further disposed on the underside of the bottom hollow body 20 are two coupling arms 34, 36, between which the mounting portion 12 of the main brake cylinder (not further shown) is received. The two coupling arms 34, 36 each have a coupling aperture 38, 40, said coupling apertures being aligned along a common axis A. The mounting portion 12 has a receiving aperture 42, which during assembly is brought into axial alignment with the coupling apertures 38, 40.

There now follow detailed descriptions of various constructions according to the invention of the coupling arrangement 14:

In the case of the first embodiment according to FIGS. 2a-2e, FIG. 2a shows a sectional view of the coupling arrangement 14 during assembly, wherein the sectional plane contains the axis A. FIG. 2b shows a three-dimensional detail view of the coupling arms with the coupling bolt received therein. FIG. 2c shows a corresponding three-dimensional detail view without the coupling bolt. FIGS. 2d and 2e show the front and rear view of a coupling arm.

In particular it is evident that the two coupling arms 34, 36 are arranged in a mirror-inverted manner to one another on the underside of the bottom hollow body 20 of the fluid reservoir 10. The mounting portion 12 of the main brake cylinder housing is received in an intermediate space 44 between the two coupling arms 34, 36, wherein the receiving aperture 42 of the mounting portion 12 is situated in axial alignment with the two coupling apertures 38, 40. During assembly according to FIG. 2a a coupling bolt 46 is inserted from the left side along the longitudinal axis A (see arrow).

The coupling bolt 46 has a circumferential, radially protruding bead 48. In a partially assembled state, which is shown in FIG. 2a above the axis A, this bead is situated initially outside of the intermediate space 44. In the assembled state the coupling bolt 46 has been pushed in the direction of the longitudinal axis A so far to the right (arrow) that it slides through the coupling aperture 38 in the coupling arm 34 and latches in behind the latter. This assembly state is shown in FIG. 2a below the axis A.

It is evident from the figures that the two coupling arms 34, 36 are arranged so as to be configured in a minor-inverted manner relative to one another and each have regions of a material cutout 50, 52 in order to cut down on material and weight. It is further evident from the figures that the two coupling arms 34, 36 are provided in each case with a cutout 54, 56 that runs out in a downward direction from the coupling aperture 38, 40. In other words, the two coupling arms 34, 36 in this region are locally weakened by the cutouts 54, 56.

It is moreover evident that there are distributed at regular intervals (120°) over the circumference of the coupling apertures 38, 40 projecting support portions, so-called support segments 58, 60, 62, which have a substantially cylindrical inner circumferential surface, with which they move into supporting abutment with the outer circumferential surface of the inserted coupling bolt 46. By virtue of the cutouts 54, 56 opening out into the coupling apertures 38, 40 the bottom support segments 58, 60 are configured with a smaller wall thickness in the direction of the axis A than the upper support segment 62. This achieves the effect of lending the bottom support segments 58, 60 a greater elastic deformability. When the coupling bolt 46 is inserted, as shown in FIG. 2a, the support segments 58, 60, 62 move into interaction with the bead-like projection 48. During assembly, upon the transition from the state according to FIG. 2a above the axis to the state according to FIG. 2a below the axis A, the bottom support segments 58, 60 that are weakened in terms of wall thickness are merely elastically (but not plastically) deformed, wherein the top support segment 62 is neither elastically nor plastically deformed. This makes it possible to achieve a reliable assembly, wherein it is guaranteed that only the bottom support segments 58, 60 that are weakened in terms of wall thickness and are specially provided for this purpose are elastically deformed.

After assembly forces are transmitted between the components, fluid reservoir 10 and main brake cylinder, via the coupling arrangement 14, wherein in this connection the coupling bolt 46 is supported securely against the support segments 58, 60, 62. The latching by means of the bead-like projection 48 may be maintained reliably throughout the service life.

Finally it should be noted that in the assembled position the, in FIGS. 2a and 2b right, end of the coupling bolt 46 protrudes by the distance d from the coupling aperture 40 of the coupling arm 36, thereby enabling a suitable tool to be applied to this protruding portion, should disassembly prove necessary.

The result is therefore a coupling arrangement 14 that is of a simple design and is easy to assembly and which offers a secure fastening of the fluid reservoir 10 to the main brake cylinder.

In the case of the second embodiment according to FIGS. 3a-3g, FIG. 3a shows a sectional view of the coupling arrangement 14 during assembly, wherein the sectional plane contains the axis A. FIG. 3b shows a three-dimensional detail view of the coupling arms with the coupling bolt received therein. FIG. 3c shows a corresponding three-dimensional detail view without the coupling bolt. FIGS. 3d and 3e show the front and rear view of a coupling arm. Finally, FIGS. 3f and 3g show in each case a view similar to FIG. 3c to an enlarged scale to illustrate the design and mode of operation of the support segments.

To simplify the description and avoid repetition the same reference characters as above are used and only the differences from the first embodiment according to FIGS. 2a to 2e are described.

A substantial difference of this second embodiment from the first embodiment is that the cutouts 50, 52 of the two coupling arms 34, 36 extend as far as the respective coupling aperture 38, 40. These cutouts 50, 52 open from above into the respective coupling aperture 38, 40. It is further evident that in this opening region the coupling arms 34, 36 are provided with a slot-like hole 70, 72 with a rounded contour. This slot-like hole 70, 72 likewise opens out in each case into the coupling aperture 38, 40. Unlike in the first embodiment according to FIGS. 2a to 2e, in this second variant a bottom support segment 74 is provided, which is of a relatively wide construction and extends over an angular region of approximately 120°. Two top support segments 76, 78 are additionally provided. These are configured with a considerably smaller wall thickness b in axial direction than the wall thickness B of the bottom support segment 74, as may be seen particularly in FIGS. 3a, 3b, 3c and 3f.

The small wall thickness b as well as the immediate vicinity to the respective slot-like hole 70 and/or 72 provides a relatively high elastic deformability of the two upper support segments 76, 78, as is indicated in particular in FIG. 3g by the two arrows P1 and P2. This enhances the ease of assembly and guarantees that an undesired plastic deformation of the support segments 76, 78 during assembly does not occur. By virtue of the purposeful elastic deformation of the two upper support segments 76, 78 it is also guaranteed that during assembly the wide bottom support segment 74 is not adversely affected or damaged at all by plastic deformation. In the assembled state the coupling bolt 46 is accommodated in a snug and fixed manner and securely latched in its position shown in FIG. 3a and/or 3b.

In the case of the third embodiment according to FIGS. 4a to 4e, it is evident that the views are the same as those described with reference to FIGS. 2a to 2e. To simplify the description and avoid repetition, the same reference characters as above are used and only the differences from the previously described embodiments according to [sic] are described.

The embodiment according to FIGS. 4a to 4e is substantially a combination of the previously described first and second embodiments.

It is evident that in the two coupling apertures 38, 40 a total of four support segments 80, 82, 84, 86 are provided at regular angular intervals (90°), wherein the top support segments 84, 86 in accordance with the second embodiment according to FIGS. 3a to 3f are configured with a reduced wall thickness b. The two bottom support segments 80, 82 in terms of their wall thickness in axial direction are configured in the same manner as the bottom support segment 74 in accordance with the second embodiment according to FIGS. 3a to 3f but result from the fact that this bottom support segment is once more divided by an intermediate space 88.

It is further evident that the coupling bolt 46 at its, in FIGS. 4a and 4b left, end is provided with a flange-like top portion 89, by means of which it may be displaced in the described manner for latching purposes.

In the case of the fourth embodiment according to FIGS. 5a to 5e, it is evident that the views are the same as described with reference to FIGS. 3a to 3e. To simplify the description and avoid repetition, the same reference characters as above are used and only the differences from the previously described embodiments according to [sic] are described.

The fourth embodiment according to FIGS. 5a to 5e corresponds substantially to the second embodiment according to FIGS. 3a to 3e. It differs substantially in that the coupling bolt 46 is configured with a free end 92 bent at an angle of 90°, which in the assembled state may be received in a space-saving manner in the cutout 50. For this purpose, the opening region 92 (see FIGS. 5b and 5c) between the cutout 50 and the coupling aperture 38 is of a flattened construction. The arrangement of the support segments 74, 76, 78 corresponds to the arrangement as described with reference to FIGS. 3a to 3g.

The principle and mode of operation of this invention have been explained and illustrated in its preferred embodiment. However, it must be understood that this invention may be practiced otherwise than as specifically explained and illustrated without departing from its spirit or scope.

The invention claimed is:

1. Coupling arrangement between a fluid reservoir and a main brake cylinder for a motor vehicle brake system, wherein on one of the components of fluid reservoir or main brake cylinder two coupling arms with one coupling aperture each are arranged, wherein on the other component of fluid reservoir or main brake cylinder a mounting portion with a receiving aperture is arranged, wherein the two coupling arms contact the mounting portion in such a way that the coupling apertures and the receiving aperture are aligned with each other along a common axis, wherein for coupling the mounting portion to the two coupling arms a coupling bolt is insertable into the coupling apertures and the receiving aperture and is fixable relative to at least one coupling arm or to the mounting portion, wherein the coupling bolt is configured with a cylindrical shank portion and at least one radially protruding detent projection, wherein at least one of the coupling arms in the region of its coupling aperture is configured with a support portion, which has a support surface that radially supports the cylindrical shank portion, wherein a part of the support portion is configured to be elastically deformable, so that the latter during assembly of the coupling bolt is deflectable in interaction with the detent projection to produce a detent connection, and wherein the remaining part of the support portion is configured to be substantially deformation-resistant.

2. Coupling arrangement according to claim 1, wherein the elastically deformable sub-portion of the support portion is configured with a reduced wall thickness, viewed in axial direction, compared to the wall thickness of the remaining substantially deformation-resistant part of the support portion.

3. Coupling arrangement according to claim 1, wherein the support portion comprises a plurality of elastically deformable sub-portions.

4. Coupling arrangement according to claim 1, wherein the coupling aperture close to the elastically deformable sub-portion is provided with a deformation cutout that opens out into the coupling aperture.

5. Coupling arrangement according to claim 4, wherein the deformation cutout is of a slot-shaped construction preferably with rounded transitions.

6. Coupling arrangement according to claim 4, wherein the at least one deformable sub-portion of the support portion is provided in the region of the opening of the deformation cutout into the coupling aperture.

7. Coupling arrangement according to claim 6, wherein on either side of the opening of the deformation cutout into the coupling aperture a deformable sub-portion of the support portion is provided.

8. Coupling arrangement according to claim 1,
wherein the substantially deformation-resistant sub-portion of the support portion is divided into at least two segments.

9. Coupling arrangement according to claim 1,
wherein the sub-portions of the support portion are separated from one another by interruptions.

10. Coupling arrangement according to claim 1,
wherein the sub-portions of the support portion are disposed at regular angular intervals around the longitudinal axis of the coupling aperture.

11. Coupling arrangement according to claim 1,
wherein the coupling arms are formed, preferably integrally moulded, on the fluid reservoir and the mounting portion is formed, preferably integrally moulded, on the main brake cylinder.

12. Coupling arrangement according to claim 1,
wherein both coupling arms in the region of the coupling aperture are configured with the previously claimed support portion structure, wherein the latter are provided in a mirror-inverted manner to one another on the coupling arms.

13. Coupling arrangement according to claim 1,
wherein the coupling bolt is manufactured from a harder material, preferably metal, than the coupling arms.

14. Coupling arrangement according to claim 1,
wherein the radially protruding projection of the coupling bolt is configured in the form of a circumferential, preferably rounded, bead.

15. Coupling arrangement according to claim 1,
wherein the projection protrudes from the outer circumferential surface of the coupling bolt in such a way that during assembly it does not exceed the elastic deformation limit of the at least one deformable sub-portion of the support portion.

16. Coupling arrangement according to claim 1,
wherein the coupling bolt on one axial end has a cylindrical top extension, the outside diameter of which is greater than the outside diameter of the shank portion and of the maximum outside diameter of the radially protruding projection.

17. Coupling arrangement according to claim 1,
wherein the coupling bolt on one axial end has an end portion bent at an angle, preferably of 90°.

18. Coupling arrangement according to claim 1,
wherein the coupling bolt in the assembled state at least one side protrudes from the associated coupling arm.

* * * * *